United States Patent Office 3,331,957
Patented July 18, 1967

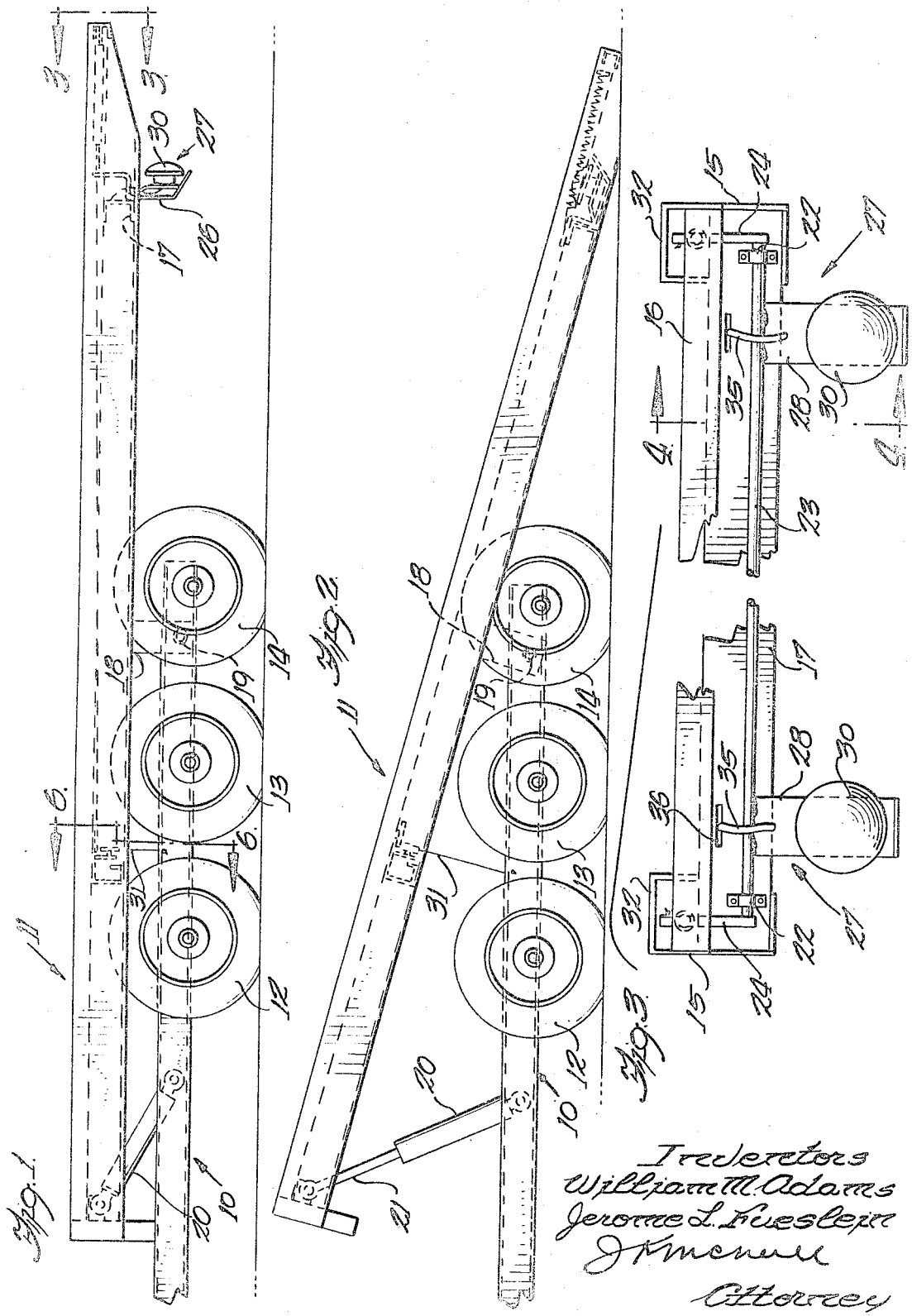

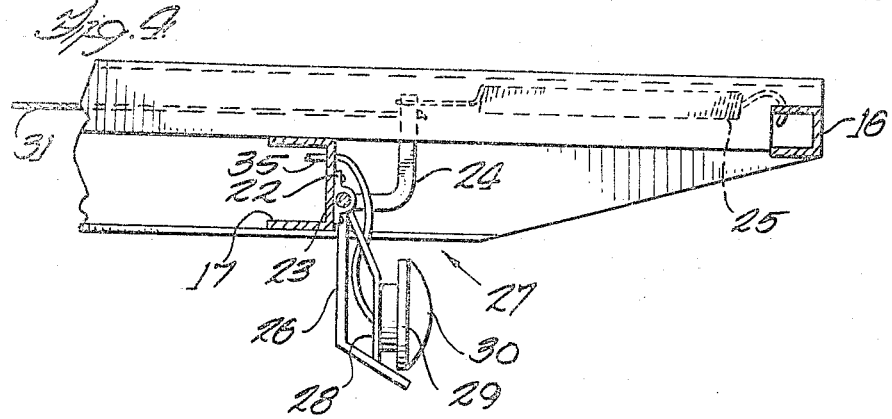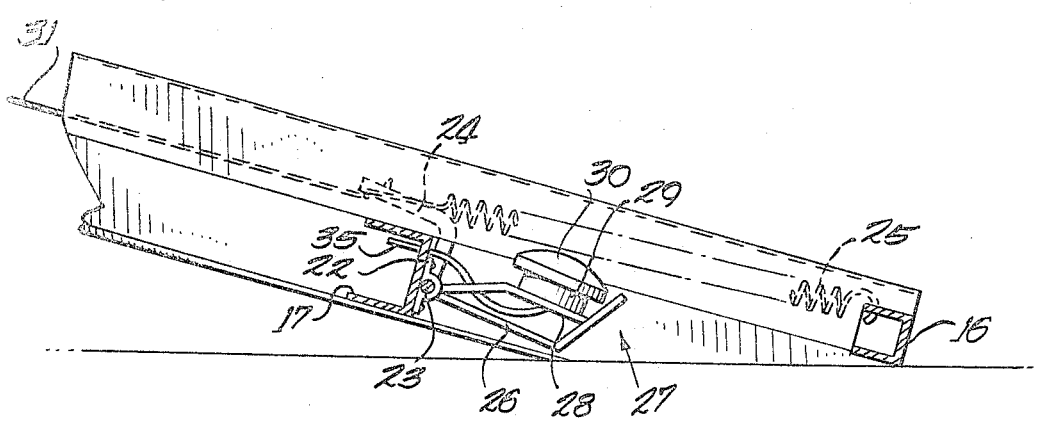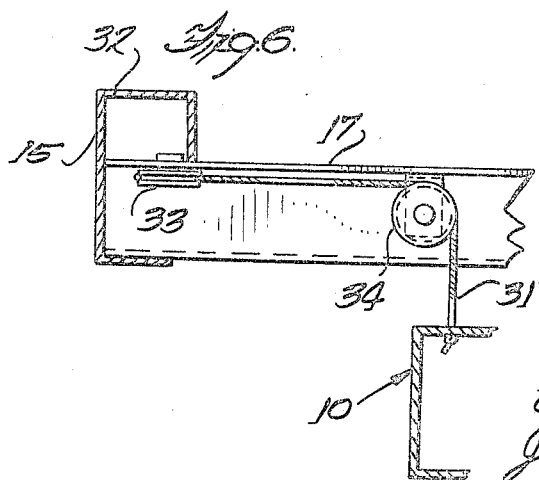

3,331,957
RETRACTABLE TAIL LIGHT FOR TILT BODY VEHICLE
William M. Adams, Stockton, and Jerome L. Fueslein, Linden, Calif., assignors to International Harvester Company, Chicago, Ill., a corporation of New Jersey
Filed June 21, 1965, Ser. No. 465,627
11 Claims. (Cl. 240—8.3)

ABSTRACT OF THE DISCLOSURE

A tail light depending from the rear end of a tilt bed trailer is protected from damage when the rear end of the bed engages the ground or the light engages an obstacle, by mounting the light on a hinged bracket which pivots upwardly to a retracted, protected location against the bias of a spring. A cable which is connected to the trailer chassis is trained over a pulley on the bed and connected to the bracket in such a way as to fold or retract the tail light when the bed is tilted and allow the spring to again lower the light when the bed assumes its horizontal position.

---

This invention relates to vehicles having tilting bodies and particularly to tail lights therefor.

Loading vehicles such as tilt bed trailers and the like include a wheeled chassis adapted to be propelled and powered by a tractor and having a loading bed pivoted on the chassis for tilting from a horizontal transport position parallel to the chassis to a loading position with the rear end of the trailer touching the ground, to facilitate loading the bed with other vehicles and the like. Since tail lights must be clearly visible, the protection of the lights from damage when the bed is tilted to its loading position has presented a substantial problem, and this invention has for its object the provision of a novel and efficient tail light mounting for tilt body vehicles.

Another object of the invention is the provision of a novel tail light assembly for a tilt bed trailer or the like wherein the light is mounted for movement from a lowered position depending below the trailer bed in the normal transporting position of the bed, to a raised protected position nested between the sides of and in the horizontal plane of the trailer bed.

Another object of the invention is the provision of novel means for mounting a tail light on a tilt bed trailer which depends below the trailer bed for clear visibility when the bed is in its horizontal transporting position and which will be swung out of the way when an obstruction is encountered while the trailer is being propelled over the ground.

Other objects and advantages of the invention will become clear from the following detailed description when read in conjunction with the accompanying drawings wherein:

FIGURE 1 is a view in side elevation of a portion of a tilt bed trailer having retractable tail light means incorporating the features of this invention, and showing the bed of the vehicle in its horizontal operating or transporting position.

FIGURE 2 is a view similar to FIGURE 1 showing the trailer bed in its tilted or loading position.

FIGURE 3 is an enlarged view taken on the line 3—3 of FIGURE 1.

FIGURE 4 is a section taken on the line 4—4 of FIGURE 3.

FIGURE 5 is a view similar to FIGURE 4 showing the tail light assembly of this invention in its retracted position, and FIGURE 6 is a section taken on the line 6—6 of FIGURE 1.

Tilt bed trucks and trailers are well known, their function in the agricultural implement industry being, in part, to facilitate transportation from one place to another of tractors, implements and the like. The conventional tilt body truck or trailer is actuated by a hydraulic hoisting cylinder which is anchored to the wheeled chassis or frame at one end and has its other end connected to the tilt body so that upon extension of the piston rod in the cylinder, the bed or body is swung upwardly about its pivot on the chassis until the rear end of the bed is in engagement with the ground, providing a ramp upon which a tractor or the like can be driven. Frequently the hydraulic cylinder for tilting the bed is of the one-way type, and when a load has been moved upon the tilted body forwardly of its pivotal connection to the chassis, the cylinder is retracted and the body or bed returns to its normal horizontal transporting position.

In the drawings, the chassis is designated by the numeral 10 and the bed by the numeral 11. The chassis 10 is of conventional rectangular construction, supported by laterally spaced pairs of wheels 12, 13 and 14, and it may be understood that the forward end thereof, not shown, is adapted for attachment to a tractive vehicle having thereon a source of fluid pressure.

The trailer bed 11 is also rectangular and its frame includes side frame members 15 and end bar 16 and a plurality of longitudinally spaced cross bars 17.

Intermediate the ends of the bed 11, a pair of laterally spaced depending brackets 18, only one of which is shown, are affixed to the bed and are mounted at their lower ends upon pivot pins 19 carried by the chassis 10, whereby the bed 11 is tiltable from the position shown in FIGURE 1 to that of FIGURE 2. Tilting of the bed about the axis of pivot pins 19 from the position of FIGURE 1 to that of FIGURE 2 is accomplished by the provision of a hydraulic cylinder 20 mounted upon the chassis 10 at its lower end and having a piston rod 21 slidable therein and pivotally connected to the forward end of the bed 11. It may be understood that the cylinder 20 is provided with fluid under pressure in any well known manner from the propelling vehicle to actuate the cylinder from the collapsed position of FIGURE 1 to the extended position of FIGURE 2 to tilt the bed 11 and cause the rear end thereof to approach or engage the ground.

On the rearmost cross member 17 are mounted spaced bearing members 22 in which is rockably mounted a shaft 23 having secured to each end an L-shaped arm 24, to the upper end of which is anchored one end of a spring 25, the other end of which is connected to the rear bar 16. Also fixed to shaft 23 near each end thereof is a guard and supporting bracket 26, forming with shaft 23 and arm 24 means serving as a bellcrank and as part of a tail light assembly generally designated by the numeral 27.

Bracket 26 is shown in FIGURES 1, 3 and 4 in its lowered position depending vertically below the plane of the bed 11, and includes a rearwardly spaced vertical portion 28 also affixed to shaft 23 and having secured thereto a tail light housing 29 which it may be understood encloses an electric lamp and has mounted thereon a rearwardly facing lens 30. The lower end of bracket 26 is bent rearwardly engaging the lower end of the vertical support 28 and shielding light housing 29. The action of spring 25 is to bias the tail light assembly 27 to its lowered position when the bed 11 is horizontal and parallel to chassis 10 as in FIGURE 1. Upon operation of cylinder 20 to tilt the bed to the loading position of FIGURE 2 the tail light assembly is retracted by means including a flexible cable 31 connected at its rear end to the upper end of the L-shaped arm 24. Cable 31 is disposed in the upper channel shaped portion 32 of side frame bars 15 and extends therealong to a location forwardly of the bed pivot 19 where it is trained around a pulley 33 mounted on one of the cross members 17 and another pulley 34 mounted on said cross member and extends downwardly for attachment to the frame of the chassis 10.

When the bed is tilted to the position of FIGURE 2 by virtue of the fact that cable 31 is anchored to the frame 10, arm 24 is rocked forwardly against the bias of spring 25, and the tail light assembly 27 is swung upwardly about the axis of shaft 23 until lens 30 faces upwardly and the entire assembly has nested between and in the horizontal plane of the side frame numbers 15. Return of the bed 11 to the horizontal transporting position of FIGURE 1 releases the tension on the cable 31 and spring 25 so that the latter swings the tail light downwardly to its rearwardly facing operating position. Current is supplied to the tail light by any well known means as through the insulated and flexible wire 35 extending from the light assembly 27 through an opening 36 in the rearmost cross member 17 and forwardly by way of bracket 18 and chassis 10 to the battery of the tractive vehicle, not shown.

It should be understood that the automatic retraction of the tail light assembly within the confines of the tilt bed 11 upon tilting the latter to its loading position protects the tail light from damage. It should also be understood that, during forward travel of the trailer, should the bracket 26 encounter an obstruction, the tail light assembly will be swung upwardly against the bias of spring 25 and will return to its operating position when the obstruction has been passed.

It is believed that the construction and operation of the novel retractable tail light of this invention will be clearly understood from the foregoing description. It should likewise be understood that the invention has been described in its preferred embodiment and that modifications may be made therein without departing from the spirit of the invention or the scope of the appended claims.

What is claimed is:

1. In a vehicle including a wheeled chassis and a loading bed pivotally mounted on the chassis for tilting from a generally horizontal transport position to a loading position with the rear end of the bed adjacent the ground, a tail light assembly pivotally mounted on the rear end of and depending below said bed when the latter is in its horizontal position, and means forming a connection between said tail light assembly and the chassis and responsive to tilting of the bed to its loading position for swinging the tail light assembly upwardly about its pivot to a position generally parallel to said bed.

2. The invention set forth in claim 1, wherein said connection between the tail light assembly and the chassis comprises a flexible cable anchored at one end to the chassis and at its other end to said tail light assembly and having a slidable connection with said bed forwardly of the pivotal connection of the latter to the chassis.

3. The invention set forth in claim 2, wherein spring means is connected between said bed and said tail light assembly and arranged to bias said tail light assembly to its depending position, said tail light assembly being swingable upwardly against the bias of said spring means upon encountering an obstruction.

4. The invention set forth in claim 1, wherein said tail light assembly includes a bracket having a generally vertical depending portion pivoted to said bed and upon which the tail light is mounted and a rearwardly extending lower portion underlying the tail light.

5. The invention set forth in claim 4, wherein said tail light assembly includes a bell crank whose fulcrum is the pivot of said assembly on said bed and one arm of which forms said bracket, a spring being connected between said bed and the other arm of said bell crank to bias said bracket to its depending position.

6. In a vehicle including a wheeled chassis and a loading bed having laterally spaced side frame members and spaced cross members and pivotally mounted medially of its ends on the chassis for tilting from a generally horizontal transport position to a loading position with the rear end of the bed adjacent the ground, a tail light assembly movably mounted on the rear portion of the loading bed, said tail light assembly including a light depending below said bed and facing rearwardly in the transport position of the bed, and means forming a connection between the chassis and said tail light assembly and responsive to tilting of the bed to its loading position for moving said tail light assembly to a position with said light facing upwardly.

7. The invention set forth in claim 6, wherein said tail light assembly is movable from its lowered depending position to a raised position in the plane of said bed and between said side frame members when the bed is tilted.

8. The invention set forth in claim 7, wherein spring means is connected between the bed and said tail light assembly to bias the latter to its lowered position.

9. The invention set forth in claim 7, wherein said means forming a connection between the chassis and the tail light assembly is a flexible cable connected at one end to the tail light assembly and at its other end to the chassis.

10. In a vehicle having a generally rectangular body portion, a bracket depending generally vertically from and pivotally mounted on said body portion on a transverse axis, a tail light mounted on said bracket, spring means extending between said body portion and said bracket to yieldably hold the latter in its vertically depending position, said bracket being swingable about said axis away from the direction of travel of the vehicle against the bias of said spring means to a generally horizontal position when said bracket engages an obstruction, said bracket having a generally vertical portion shielding the forward side of said light and a rearwardly directed lower portion shielding the bottom of the light.

11. In a vehicle including a wheeled chassis and a loading bed mounted on the chassis for tilting from a generally horizontal transport position to a loading position with the rear end of the bed adjacent the ground, a tail light assembly movably mounted on the rear portion of the loading bed and depending therebelow in the transport position of the bed, and means forming a connection between the chassis and said tail light assembly responsive to tilting of the bed to its loading position for moving said tail light assembly from its depending position below the bed to a retracted position adjacent said bed.

References Cited

UNITED STATES PATENTS

| | | | |
|---|---|---|---|
| 1,635,393 | 7/1927 | Amans | 240—62.2 |
| 2,084,120 | 6/1937 | Ames | 240—7.1 |
| 2,662,605 | 12/1953 | Riggs | 240—7.1 |
| 2,749,431 | 6/1956 | Dover | 240—8.3 |

NORTON ANSHER, *Primary Examiner.*

D. L. JACOBSON, *Assistant Examiner.*